United States Patent Office 3,828,011
Patented Aug. 6, 1974

3,828,011
PROCESS FOR PRODUCING ADDITION HOMO-
AND CO-POLYMERS FROM EPISULPHIDES
Arnaldo Roggero, Alessandro Mazzei, and Antonio Proni,
San Donato Milanese, Italy, assignors to Snam Progetti,
S.p.A., San Donato Milanese, Italy
No Drawing. Filed May 24, 1972, Ser. No. 256,291
Claims priority, application Italy, May 24, 1971,
24,897/71
Int. Cl. C08g 23/00
U.S. Cl. 260—79                                14 Claims

ABSTRACT OF THE DISCLOSURE

A process is disclosed for producing a new series of addition homo- and co-polymers from monomers such as episulphides, with alkali metal halide catalysts (e.g. LiI) in a polar solvent balanced between donor strength and dielectric constant (e.g. hexamethylphosphoramide) with a catalyst monomer mole ratio ranging from 0.001% to 20% and at a temperature in the range from —20 to 20° C.

---

The present invention relates to a process for producing addition homo- and co-polymers starting from monomers normally sensitive to catalysts of the so-called anionic type.

In particular, the present invention relates to a process for producing addition homo- and co-polymers by making use of particular catalytic systems in polar solvents, as well as to the catalysts used in this process.

The catalysts used in the polymerization process according to the present invention consist of alkali metal halides, which are used in polar solvents having a suitable balance between donor strength and dielectric constant.

Examples, given by way of illustration, of suitable solvents are hexalkylphosphoramide (HMPA), dialkylsulphoxide (DMSO), tetrahydrofuran (THF), dialkylformamide (DMF), N,N'-dialkylacetamide, pyridine (Py), acetonitrile, dioxane, morpholine and ethers as well as mixtures thereof.

The concentration of catalyst added with respect to the introduced monomers of monomer can vary widely; in particular the range may be from 0.001% and to 20 mole percent and preferably, for economical reasons, from 0.01 and mole percent with respect to the amount of monomer.

The reaction is carried out over a broad range of temperatures, in particular ranging from —80 to +50° C. and suitably from —20 and +20° C.

The polymerisation reaction, carried out according to this invention allows the production of homopolymers and copolymers starting from saturated or unsaturated episulphides.

Examples of suitable monomers are: ethylene sulphide, propylenesulphide, cyclohexenesulphide, isobutene sulphide, allyloxy-(2,3)-epithiopropane, butadiene-monoepisulphide, vinylcyclohexenepisulphide, and the like.

The polymers obtained at a good yield may have a very high molecular weight. In this case they may be advantageously used as a plastic material if they are crystalline and their second order transition temperature (glass transition temperature) is above room temperature, or as elastomers if below. The elastomers may be vulcanizable by means of sulphur through a copolymerisation with suitable unsaturated monomers.

The polymers having a lower molecular weight may be suitably used in the production of seals, adhesives, laquers, latexes, and the like. Within the range of these applications the polymers containing sulphur in the polymer chains present the advantage of a particular resistance to the hydrocarbon solvents, even to the aromatic ones. The advantages obtained by using the catalyst according to the present invention, the operative characteristics and the peculiar products obtained according thereto, will clearly result from the following examples given only by way of illustration.

EXAMPLES 1–5

The polymerisation tests have been carried out in a 250 cm.$^3$ vessel previously deaerated.

The catalyst is added to the vessel first with the solvent and then the monomer (127 millimoles), the vessel being thereafter placed in a rotary bath maintained at the desired temperature. The relevant data are given in Table I.

TABLE I

| Ex. No. | T, °C. | Catalyst (millimoles) | Solvents, (40cc.) | Obtained polymers (grams) | $[\eta]$ tol. 30° C. (dl./g.) | Conv., percent |
|---|---|---|---|---|---|---|
| 1 | 20 | LiCl (1.27) | HMPA | 7 | 0.57 | 75 |
| 2 | 20 | NaCl (1.27) | HMPA | 9.2 | 0.64 | 98 |
| 3 | 20 | LiI (1.27) | HMPA | 9.4 | 0.80 | 100 |
| 4 | 20 | LiI (1.27) | DMSO | 8.4 | 0.99 | 90 |
| 5 | 20 | LiI (1.27) | DMF | 8.8 | 0.36 | 93 |

EXAMPLE 6

By means of the technique previously specified one copolymerized 127 millimoles of propylene sulphide and 55 mmoles of ethylene sulphide by making use, as a catalyst, of LiI (1.82 millimoles) in 40 cm.$^3$ of dimethylsulphoxide. At the end of the reaction carried out at 20° one separated 11.2 gr. of products having $$[\eta]_{\text{tol.}}^{30°\ C.} = 0.88\ \frac{\text{dl.}}{\text{gr.}}$$

EXAMPLE 7

The preceding example is repeated except that 127 millimoles of propylene sulphide, 55 millimoles of ethylene sulphide and 15 millimoles of allyloxy-(2,3)-epithiopropane are polymerized to produce 12.5 grams of a product having $$[\eta]_{\text{tol.}}^{30°\ C.} = 0.57\ \frac{\text{dl.}}{\text{gr.}}$$

We claim:
1. A process which comprises polymerizing a saturated or an unsaturated episulphide in a solvent selected from the group consisting of hexalkylphosphoramide, dialkylsulphoxide, an alkyl diether, a cycloalkyl ether, dialkylformamide, N,N'-dialkylacetamide, pyridine, acetonitrile, morpholine, formylmorpholine and their mixtures in presence of a catalytic amount of a catalyst consisting of an alkali metal halide to produce an addition homo- or copolymer of said episulphide.

2. Process according to claim 1, characterized in that the reaction is carried out in presence of an amount of catalyst comprising from 0.001 to 20 mole percent based on the amount of monomer or monomers introduced.

3. Process according to claim 1, characterized in that the reaction is carried out at a temperature of from —80 to +50° C.

4. Process according to claim 1, characterized in that the polymerization reaction takes place in the presence of lithium chloride in hexamethylphosphoramide.

5. Process according to claim 1, characterized in that the polymerization reaction takes place in the presence of sodium chloride in hexamethylphosphoramide.

6. Process according to claim 1, characterized in that the polymerization reaction takes place in the presence of lithium iodide in hexamethylphosphoramide.

7. Process according to claim 1, characterized in that the polymerization reaction occurs in the presence of lithium iodide in dimethylsulphoxide.

8. Process according to claim 1, characterized in that the polymerization reaction occurs in the presence of lithium iodide in dimethylformamide.

9. Process to claim 1 wherein propylene sulphide is polymerized.

10. Process according to claim 1 wherein propylene sulphide and ethylene sulphide are polymerized.

11. Process according to claim 1 wherein propylene sulphide, ethylene sulphide and alloyloxy-(2,3-epithiopropane are polymerized.

12. Process according to claim 1, characterized in that the reaction is carried out in the presence of an amount of catalyst comprising from 0.01 to 2 mole percent based on the amount of monomer or monomers introduced.

13. Process according to claim 3, characterized in that the reaction is carried out at a temperature of from −20° C. to +20° C.

14. A process which comprises polymerizing an episulphide selected from the group consisting of ethylene sulphide, propylene sulphide, cyclohexene sulphide, isobutene sulphide, allyloxy-(2,3)-epithiopropane, butadienemonoepisulphide, vinylcyclohexeneepisulphide and mixtures thereof in a polar solvent selected from the group consisting of a hexaalkylphosphoramide, a dialkylsulfoxide, an alkyl diether, a cycloalkyl ether, a dialkyl formamide, an N,N'-dialkylacetamide, pyridine, acetonitrile, morpholine, formylmorpholine, and a mixture thereof, in the presence of an alkali metal halide catalyst, the catalyst comprising from 0.001 to 20 mole percent based on the amount of monomer or monomers introduced, and the reaction temperature being in the range of from −80 to +50° C. to produce an addition homo- or copolymer of said episulphide.

References Cited

UNITED STATES PATENTS

| | | | |
|---|---|---|---|
| 3,651,031 | 3/1972 | Boucheron | 260—79 |
| 3,317,919 | 5/1967 | Sander | 260—79 |
| 3,317,920 | 5/1967 | Sander | 260—79 |
| 3,407,182 | 10/1968 | Hinton | 260—79 |
| 3,222,326 | 12/1968 | Brodoway | 260—79.7 |
| 3,624,052 | 11/1971 | Gobran | 260—79 R |
| 3,624,055 | 11/1971 | Gobran | 260—79.7 |

MELVYN I. MARQUIS, Primary Examiner

U.S. Cl. X.R.

252—429 R; 260—79.1, 79.7